United States Patent [19]
Perry et al.

[11] Patent Number: 5,199,851
[45] Date of Patent: Apr. 6, 1993

[54] HELICOPTER ROTOR BLADES

[75] Inventors: Frederick J. Perry, Yeovil; Alan Brocklehurst, Sherborne, both of England

[73] Assignee: Westland Helicopters Ltd., England

[21] Appl. No.: 781,412

[22] Filed: Oct. 23, 1991

[30] Foreign Application Priority Data

Oct. 24, 1990 [GB] United Kingdom ............... 9023141

[51] Int. Cl.⁵ ..................... B64C 11/16; B64C 27/46
[52] U.S. Cl. ............................. 416/223 R; 416/228; 416/235; 416/242; 416/243
[58] Field of Search ............... 416/223 R, 228, 235, 416/237, 242, 243, DIG. 2

[56] References Cited
U.S. PATENT DOCUMENTS

| | | | |
|---|---|---|---|
| 3,467,197 | 9/1969 | Spivey et al. | 416/228 |
| 4,046,336 | 9/1977 | Tangler . | |
| 4,324,530 | 4/1982 | Fradenburgh et al. | 416/228 |
| 4,334,828 | 6/1982 | Moffitt | 416/228 |

*Primary Examiner*—Edward K. Look
*Assistant Examiner*—Mark Sgantzos
*Attorney, Agent, or Firm*—Larson & Taylor

[57] ABSTRACT

A helicoper rotor blade includes at its outer end a tip vane having a mean chord length greater than fifty percent of a chord length of a blade central portion and a span length greater than fifty percent of the blade chord which in operation generates two approximately equal strength tip vortices to reduce an acoustic impulse and a resulting noise known as blade slap.

17 Claims, 2 Drawing Sheets

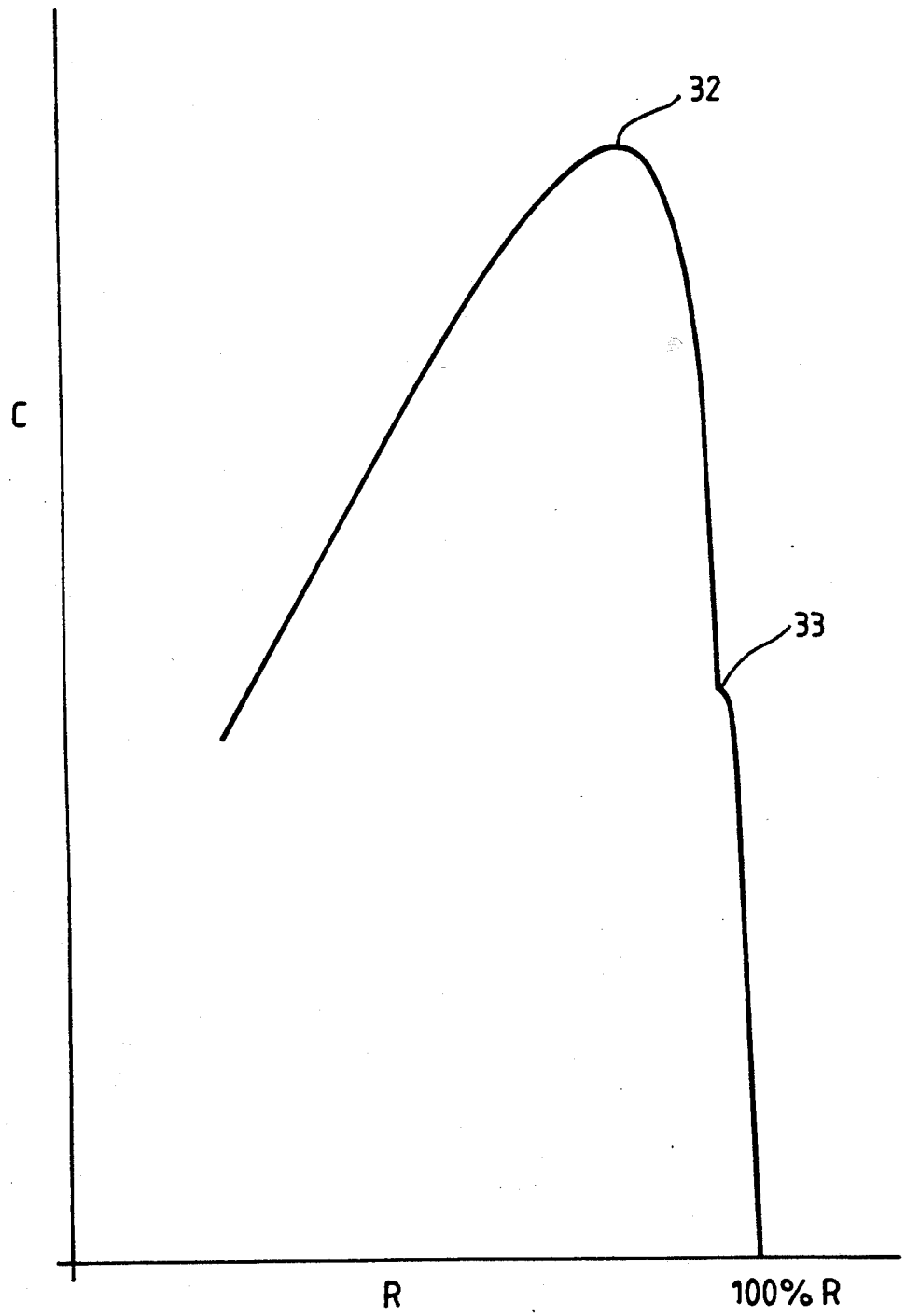

HELICOPTER ROTOR BLADES

BACKGROUND OF THE INVENTION

1. Field of the Invention

This invention relates to helicopter rotor blades.

In operation, vortices trailed from the tip region of a helicopter rotor blade as it rotates in the rotor disc are intersected by the following blades resulting in an impulsive blade/vortex interaction noise known as blade slap. Often the strongest interaction occurs due to a blade intersecting its own trailed vortex which may lie parallel to the span of the blade in the advancing rear quadrant of the rotor disc.

2. Description of the Prior Art

U.S. Pat. No. 4,046,336 discloses a rotor blade having a sub-wing ("tip vane") structure at its tip intended to divide the vortex into approximately equal vortices each containing only half the peak velocity of the single vortex in order to reduce pressure transients effective on the blade and to reduce the acoustic impulse that generates blade slap.

In one arrangement, the prior art blade includes a small sub-wing extended from the blade tip and having a span length between about 0.50 to 0.25 the local blade chord length and a chord length of about 0.20 the local blade chord length.

In another arrangement, the prior art blade includes a split tip portion comprising an upswept leading edge portion and a downswept trailing edge portion, the span of the respective portions and the deviation angle being selected so that the spanwise spacing between the tips is again between about 0.50 and 0.25 the local blade chord length. Similarly, the chord length of the leading edge portion is about 0.20 the local blade chord length.

In order to generate vortices of approximately equal strength we believe it to be essential to ensure that aerodynamic load is carried smoothly from the blade on to the sub-wing structure and that the sub-wing is of sufficient size to carry adequate loading. Due to the small chord and spanwise lengths of the sub-wing arrangement of the prior art rotor blade and the abrupt change in aerofoil section between the blade and the sub-wing which may prevent efficient load transfer, we consider it unlikely that the two tip vortices would be of similar strength and more likely that the device would encourage the formation of a main vortex and an associated smaller vortex issuing from the end of the sub-wing and which would rotate at a significant rate around the main vortex.

This feature results from the short span length of the sub-wing arrangement and the corresponding short distance between the tips of the leading and trailing portions of the split tip arrangement. However, the short span length and distance between the split tips is stated to be intended to ensure that the two vortices remain separated for a distance equal to about 30 chord lengths but re-combine into one vortex with a diffused core before it is encountered by the following blade.

The sub-wing of the prior art is untwisted and it is believed this could lead to flow separation on the upper surface in the area of the blade/sub-wing junction which may result in increased drag load during operation.

An objective of this invention is to provide a helicopter rotor blade which generates during operation two approximately equal strength vortices which remain discrete for as long as possible. Another objective is to provide such a rotor blade which would maintain attached flow over the surface of a vane tip to avoid a drag penalty.

SUMMARY OF THE INVENTION

Accordingly this invention provides a helicopter rotor blade including a central portion of aerofoil cross section having a leading edge and a trailing edge defining a chord length and extending between an inner end for attachment to a rotor hub and an outer end including a tip vane of aerofoil section extending outwardly from a chordwise blade edge at the outer end of the central portion, said tip vane having an outer chordwise tip edge defining during operation a one hundred percent rotor operating radius, characterised in that said tip vane has a mean chord length greater than fifty percent of the chord length of the central portion and a span length greater than fifty percent of the chord length of the central portion.

The chordwise blade edge may be located at a blade radius station corresponding to a rotor operating radius not greater than 96 percent. Preferably the chordwise blade edge is located at a blade radius station corresponding to a rotor operating radius between 92 percent and 96 percent.

The leading edge of the blade central portion may curve outwardly and forwardly to a point coincident with an extension of said chordwise blade edge, the tip vane having a leading edge swept rearwardly from said point to intersect the outer chordwise tip edge, and a trailing edge swept rearwardly from a junction with said chordwise blade edge to intersect the outer chordwise tip edge so as to define a tip vane having an inner chordwise length of at least 60 percent of the chord length of the central portion and an outer chordwise length along said chordwise tip edge of at least 45 percent of the chord length of the central portion.

The forwardly swept point may be located forward of the blade central portion leading edge at a distance equivalent to about 15 percent of the chord length of the central portion and the tip vane leading edge may be swept rearwardly at an angle of about 42 degrees.

Preferably the tip vane incorporates dihedral of about five degrees and an upper surface of the tip vane blends smoothly with an upper surface of the blade central portion. A lower surface of the blade central portion curves upwardly then outwardly to blend smoothly with a lower surface of the tip vane.

Preferably, the aerofoil section of the tip vane tapers downwardly in thickness throughout its span and may comprise a cambered aerofoil section.

The aerofoil section of the tip vane may incorporate reciprocal twist. Preferably the twist at the outer end is approximately the same as that of the outer end of the central portion of the blade and increases inboard in a nose down sense.

BRIEF DESCRIPTION OF THE DRAWINGS

The invention will now be described by way of example only and with reference to the accompanying drawings in which, FIG. 3 is a graph to illustrate operational characteristics of the rotor blade of this invention.

DETAILED DESCRIPTION OF THE DRAWINGS

Figure 1:
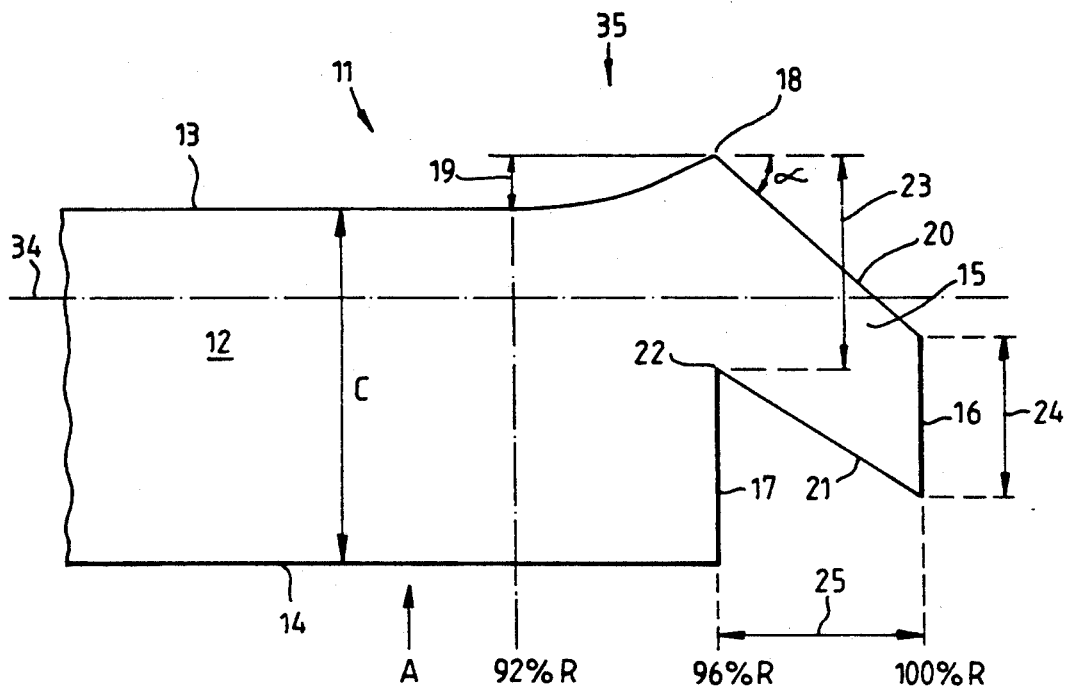
FIG. 1 is a fragmentary plan view of a helicopter rotor blade constructed in accordance with the invention.
Figure 2:
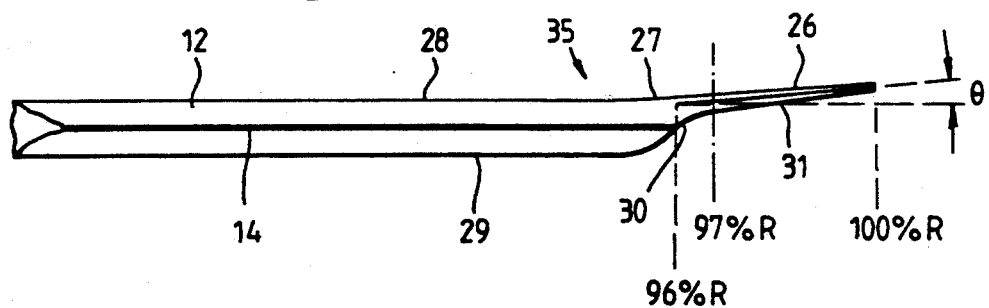
FIG. 2 is a side view taken on arrow A of FIG. 1.

Referring now to FIG. 1, a helicopter rotor blade 11 includes a central portion 12 of aerofoil cross-section having a leading edge 13 and a trailing edge 14 defining a chord length C taken perpendicular to a pitch change or reference axis 34. The central portion 12 extends between an inner or root end (not shown) arranged during operation for connection to a rotor hub and an outer end 35 which includes a vortex generating tip vane 15.

The tip vane 15 has an outer chordwise extending tip edge 16 defining a blade span and, during operation, a 100 percent rotor operating radius (100 percent R) taken from an axis of rotation of the rotor hub on which the blade 11 is fitted. The tip vane 15 extends outwardly from a chordwise extending blade edge 17 at the outer end 35 of the blade central portion 12 and which, in the illustrated embodiment, is located at a blade radius station corresponding to about 96 percent R.

At a blade radius station corresponding to about 92 percent R, the leading edge 13 commences to curve forwardly to a point 18 spaced-apart forwardly of and aligned with chordwise blade edge 17. Point 18 is spaced apart forwardly of leading edge 13 by a distance 19 equivalent to about 0.15C (15 percent C).

From point 18, a leading edge 20 of tip vane 15 is swept rearwardly at an angle α of about 42 degrees to intersect with tip edge 16. A trailing edge 21 of tip vane 15 is swept rearwardly from an intersection 22 wit chordwise blade edge 17 to intersect tip edge 16, so as to define a tip vane 15 having an inner chord length 23 perpendicular to reference axis 34 equivalent to about 0.60C (60 percent C) and an outer chord length 24 along tip edge 16 and perpendicular to reference axis 34 equivalent to about 0.45C (45 percent C). The mean chord length of the tip vane 15 of the illustrated embodiment is therefore 0.525C (52.5 percent C).

As described, tip vane 15 has a spanwise length 25 equal to about 4 percent R which in one embodiment tested was equivalent to about 0.5865C (58.65 percent C). For blades having a higher aspect ratio than that used in tests, the spanwise length 25 of the tip vane 15 would be proportionally greater in relation to the basic blade chord length C.

Tip vane 15 incorporates dihedral Θ of about 5 degrees and its upper surface 26 is blended smoothly in blend region 27 with an upper surface 28 of blade central portion 12. The blend and twist in the region of the junction between the central blade portion 12 and tip vane 15 is such that streamwise flow remains attached on the lower surface and, towards the rear, a lower surface 29 of the central portion 12 curves upwardly then outwardly in region 30 to blend with a lower surface 31 of vane tip 15.

The aerofoil section of the tip vane 15 tapers in thickness through its span and in the illustrated embodiment this is accomplished by gradual change of the aerofoil section from RAE 9645, cambered section at a blade radius station equivalent to about 97 percent R to cambered thinner aerofoil section RAE 9634 at 100 percent R. This gradual change of aerofoil section along the span of the tip vane 15 optimises the lift capabilities in a central region of the tip vane 15 just outboard of the blade/tip vane junction along chordwise edge 17.

A resulting change in zero lift angle through the span of the tip vane 15 is taken into account in defining the geometric twist and, because the tip vane 15 operates in the circulatory flow of the inboard tip vortex, the tip vane 15 must be twisted to obtain a desired loading along its span such that the circulation distribution is close to elliptic. As shown in FIG. 3 which plots bound circulation (C) against non-dimensional radius (R), the circulation over the inner part of the tip vane 15 is also designed to similarly reduce from a maximum bound circulation on the blade just inboard of the blade/tip vane junction as indicated at 32 to about 50 percent circulation at the blade/tip vane junction as indicated at 33, and this design feature ensures during operation that the two vortices are shed with approximately equal strengths.

The twist used in the tip vane 15 of this invention approximates to reciprocal twist (with respect to a non-dimensional radial span) in the wash-in sense over the tip vane 15 such that the angle at the end of tip vane 15 is slightly nose up and approximately the same as that of the outer and of the blade central portion, with inner sections of the tip vane 15 being twisted strongly nose down. The radical variation of velocity is also taken into account in determining the twist and chord characteristics of the tip vane 15.

Thus, the rotor blade of this invention incorporates a tip vane 15 which is distinguished from that of the prior art disclosure of U.S. Pat. No. 4,046,336 by the following features.

1. The platform area of the tip vane 15 is much larger than that of the prior art device having a mean chord length greater than 50 percent C and a spanwise length also greater than 50 percent C.

This feature ensures that the tip vane 15 is sufficiently large to generate equal strength vortices and the chord dimension ensures that the tip vane 15 will shed 50 percent of the circulation on the blade without lift coefficients on the tip vane 15 becoming too high and causing early stall and consequent rise in power. The spanwise length of the tip vane 15 which in the described embodiment is equivalent to 4 percent R or 58.65 percent C is considered the minimum required to achieve a desired spacing between the two vortices to ensure that they remain discrete. It is considered that the spanwise length may be increased up to a length equivalent to about 6 percent R and the spanwise length will be proportionally greater in relation to the blade chord C as blade aspect ratios increase.

2. Tip vane 15 incorporates dihedral to "switch on" the tip vane 15 in a forward advancing quadrant of a rotor disc incorporating the blades of this invention and to control the loading on the tip vane 15 in order to generate approximately equal strength vortices in the advancing forward quadrant whilst off-loading the tip vane 15 in the other quadrants of the rotor disc.

3. Tip vane 15 embodies a unique combination of twist, taper, forward offset, sweep and camber to optimise aerodynamic characteristics.

The use of the described twist ensures that a desired loading along the span of the tip vane 15 is obtained to ensure that the circulation distribution is close to elliptic. The twist achieves the desired circulation whilst preventing angles of attack occurring which are greater than the stall angle of the local aerofoil section to prevent flow separation and attendant drag loads.

The tapering of the thickness of the tip vane 15 towards chordwise tip edge 16 assists optimization of the lift and drag capabilities in the central region of the tip vane.

Forward offset of leading edge 13 to junction 18 generates an extended leading edge which usefully offloads the inboard junction region of the tip vane 15 and therefore establishes a region of strongly attached flow at the outer end of the blade central portion 12. The flow of the blade/tip van junction remains attached and the divergence of pitching moments is therefore suppressed which is of great value for a helicopter blade in penetrating the retreating blade stall envelope.

The rearwardly swept region of the tip vane 15 assists the performance of the blade on the advancing side of the rotor disc by allowing the tip vane to carry sufficient loading whilst at the same time suppressing the development of shock-induced drag and moment rise.

In designing a new rotor blade tip it is important to constrain the pitching moment and this is of particular importance in respect of this invention since as described the tip vane 15 is sufficiently large to generate equal strength vortices. The combination of forward offset, sweep and taper in the tip vane 15 according to one embodiment of this invention is designed to balance the pitching moments applied about the feathering axis 34 that is usually coincident with 25 percent C and the blade of this invention performs well in balancing pitching moments through a wide range of operating conditions, with only a very gradual rise occurring in pitching moments at stall. In other embodiments, the forward offset, sweep and taper of tip vane 15 may be used as a means of controlling the aeroelastic twisting of the rotor blade 11 to further optimise performance characteristics.

The use of cambered aerofoil sections assists in providing the aforementioned loading of the tip vane 15.

4. The smooth blend between the upper surfaces of the blade 12 and tip vane 15 ensures that the aerodynamic loading is transferred to the tip vane without an interference drag penalty.

The blend and twist in the region of the blade/tip vane junction is such that flow is attached on the lower surface, and the blending upwardly of the lower surface of blade 12 towards the rear of the tip vane 15 encourages the formation of an inboard vortex with a small core.

These features combine to provide a helicopter rotor blade having a tip vane 15 which during operation generates two approximately equal strength tip vortices in the advancing forward quadrant of the rotor disc which each contain therefore only half the peak velocity of a single vortex in order to significantly reduce the acoustic impulse because of reduced pressure transients experienced on the blade. Moreover the two vortices tend to rotate slowly around each other due to mutual interference so as to remain discrete for as long as possible and preferably until after the passage of the following blade. Even if this is not achieved the greater spanwise length of the tip vane 15 of this invention compared to the prior art device means that the vortices are sufficiently spaced apart to ensure a combined vortex with a significantly larger diffused core which greatly reduces peak acoustic pressures.

Whilst one embodiment has been described and illustrated it will be understood that many modifications may be made without departing from the scope of the invention as defined in the appended claims. For example the forward offset distance of point 18 and angle of sweep α of tip vane 15 can vary from those of the illustrated embodiment and will be dependent on the need to balance the pitching moment in a particular installation. The sweep angle is dictated by the design tip Mach number and the forward offset dimension will increase as the sweep angle increases. Similarly the angle of dihedral can be varied to optimise characteristics of particular rotor blades.

What is claimed is:

1. A helicopter rotor blade including a central portion of aerofoil section having a leading edge and a trailing edge defining a chord length and extending between an inner end for attachment to a helicopter rotor hub and an outer end having a chordwise blade edge extending forwardly from said trailing edge through part of a said chord length, and a tip vane of aerofoil section extending outwardly from said outer end, said tip vane having a leading edge swept rearwardly from the central portion leading edge and a trailing edge swept rearwardly from an intersection with said chordwise blade edge, outer ends of said tip vane leading and trailing edges defining an outer chordwise tip edge defining during operation a one hundred percent operating radius, said tip vane having a mean chord length greater than fifty percent of the chord length of the central portion and a spanwise length greater than fifty percent of the chord length of the central portion whereby in operation approximately equal strength tip vortices are generated at the chordwise blade edge and the outer chordwise tip edge to reduce an acoustic impulse noise normally associated with a vortex trailed from the tip region of helicopter rotor blades.

2. A rotor blade as claimed in claim 1, wherein said tip vane leading edge extends rearwardly from a point located outwardly and forwardly of the central portion leading edge and coincident with an extension of said chordwise blade edge to define a tip vane having an inner chordwise length of at least sixty percent of chord length of the central portion and an outer chordwise length along said chordwise tip edge of at least forty five percent of the chord length of the central portion.

3. A rotor as claimed in claim 1, wherein said chordwise blade edge is located at a blade radius station corresponding to a rotor operating radius not greater than ninety six percent.

4. A rotor blade as claimed in claim 3, wherein said chordwise blade edge is located at a blade radius station corresponding to a rotor operating radius between ninety two and ninety six percent.

5. A rotor blade as claimed in claim 2, wherein said forwardly swept point is located forward of the blade central portion leading edge at a distance equivalent to about fifteen percent of the chord length of the central portion.

6. A rotor blade as claimed in claim 2, wherein the tip vane leading edge is swept rearwardly at an angle of about forty two degrees.

7. A rotor blade as claimed in claim 1, wherein said tip vane incorporates dihedral.

8. A rotor blade as claimed in claim 7, wherein said dihedral is about 5 degrees.

9. A rotor blade as claimed in claim 1, wherein an upper surface of the tip vane blends smoothly with an upper surface of the blade central portion.

10. A rotor blade as claimed in claim 1, wherein a lower surface of said blade central portion curves upwardly then outwardly to blend smoothly with a lower surface of the tip vane.

11. A rotor blade as claimed in claim 1, wherein the aerofoil section of the tip vane tapers downwardly so as to reduce the thickness of the aerofoil section throughout its span.

12. A rotor blade as claimed in claim 1, wherein the aerofoil section of the tip vane is a cambered aerofoil section.

13. A rotor blade as claimed in claim 1, wherein the aerofoil section of the tip vane incorporates reciprocal twist.

14. A rotor blade as claimed in claim 13, wherein the twist at the end of the tip vane is approximately the same as that of the outer end of the central portion of the blade and increases inboard in a nose down sense.

15. A helicopter rotor blade including a central portion of aerofoil section having a leading edge and a trailing edge defining a chord length and extending between an inner end for attachment to a helicopter rotor hub and an outer chordwise blade edge at the outer end of the central portion, said blade having a tip vane of aerofoil section extending outwardly from said chordwise blade edge and having an outer chordwise tip edge defining during operation a one hundred percent rotor operating radius, the tip vane having a leading edge swept rearwardly from a point located forwardly of said central portion leading edge to intersect the outer chordwise tip edge and a trailing edge swept rearwardly from a junction with said chordwise blade edge to intersect the outer chordwise tip edge to define a tip vane having an inner chordwise length of about sixty percent of the chord length of the central portion and an outer chordwise length along said chordwise tip edge of about forty five percent of the chord length of the central portion whereby said tip vane has a mean chord length greater than fifty percent of the chord length of the central portion and a spanwise length greater than fifty percent of the chord lenght of the central portion, said tip vane incorporating dihedral and having an upper surface blended smoothly with an upper surface of the blade central portion and wherein a lower surface of said central portion curves upwardly then outwardly to blend smoothly with a lower surface of the tip vane.

16. A helicopter rotor blade including a central portion of aerofoil section having a leading edge and a trailing edge defining a chord length an extending between an inner end for attachment to a helicopter rotor hub and an outer chordwise blade edge at the outer end of the central portion, said blade having a tip vane of aerofoil section extending outwardly from said chordwise blade edge and having an outer chordwise tip edge defining during operation a one hundred percent rotor operating radius, the tip vane having a leading edge swept rearwardly from a point located forwardly of said central portion leading edge to intersect the outer chordwise tip edge and a trailing edge swept rearwardly from a junction with said chordwise blade edge to intersect the outer chordwise tip edge to define a tip vane having an inner chordwise length of about sixty percent of the chord length of the central portion and an outer chordwise length along said chordwise tip edge of about forty five percent of the chord length of the central portion whereby said tip vane has a mean chord length greater than fifty percent of the chord length of the central portion and a spanwise length greater than fifty percent of the chord length of the central portion, and said aerofoil section of the tip vane incorporated reciprocal twist.

17. A rotor blade as claimed in claim 16, wherein the twist at the end of the tip vane is approximately the same as the outer end of the central portion of the blade and increases inboard in a nose down sense.

* * * * *